(No Model.)

G. W. LOVE.
DOUBLE STRAWBERRY RUNNER CUTTER.

No. 337,174. Patented Mar. 2, 1886.

WITNESSES:
C. W. Russell
B. F. Wheeler

INVENTOR:
George W. Love
By Roscoe B. Wheeler
atty

UNITED STATES PATENT OFFICE.

GEORGE W. LOVE, OF PERE CHENEY, MICHIGAN.

DOUBLE STRAWBERRY-RUNNER CUTTER.

SPECIFICATION forming part of Letters Patent No. 337,174, dated March 2, 1886.

Application filed December 11, 1885. Serial No. 185,361. (No model.)

*To all whom it may concern:*

Be it known that I, GEORGE W. LOVE, a citizen of the United States, residing at Pere Cheney, in the county of Crawford and State of Michigan, have invented certain new and useful Improvements in Double Strawberry-Runner Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention relates to a device for cutting the runners from strawberry-plants, and is so constructed that it cuts simultaneously the runners from two sides of a plant or row of plants, and is designed as a hand-machine, as will be fully set forth; and my invention consists in the combination of parts as hereinafter set forth, and pointed out particularly in the claims.

Figure 1:
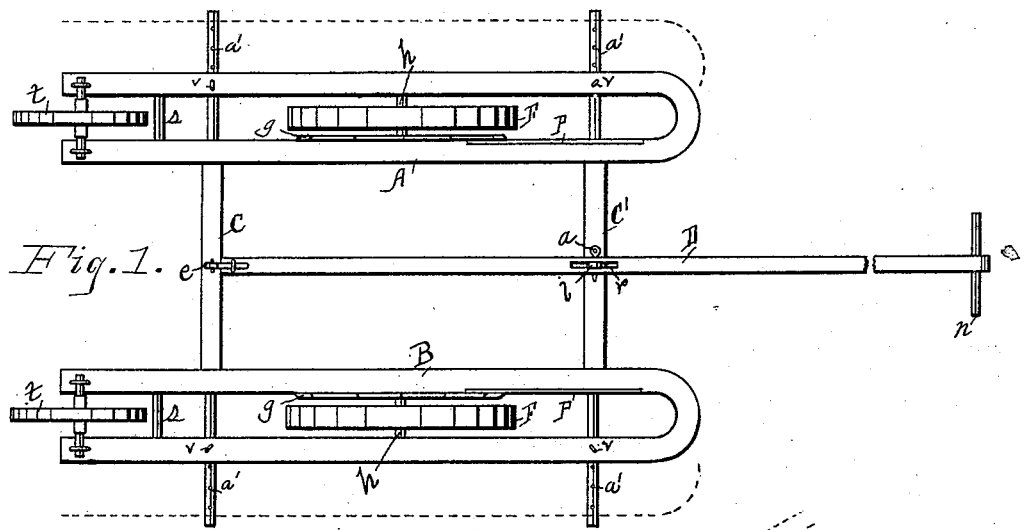
Figure 2:
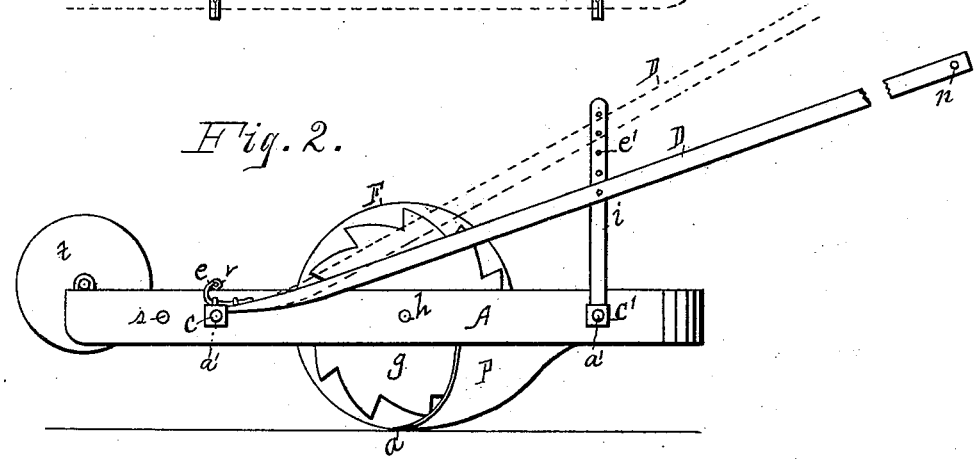
Figure 3:
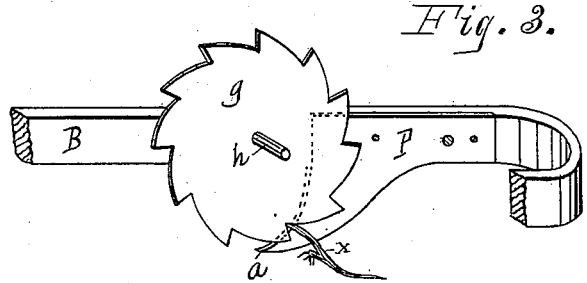

In the drawings forming a part of this specification, Figure 1 is a top plan of my invention. Fig. 2 is a side elevation. Fig. 3 is a detail.

I construct the machine with two frames, A B. I journal in each a shaft, $h$. I mount on each shaft a drive-wheel, F, and a circular toothed cutting-disk $g$. The circumference of the drive-wheels and cutting-disks are the same, and are arranged side by side. The cutting-disks are attached firmly to the shaft, the same as the drive-wheels, and revolve with said drive-wheels when operating the machine. The face of the cutting-disks $g\,g$ works flush with the hooked stationary knife-blades P P. Said blades are attached one to each of the inner bars of the sections A B, as shown in Fig. 1. The knife-blades are provided with a hooking-point, as shown at $a$ of Figs. 1 and 2. I show the frames A B as U-shaped, formed from a single strip; or they may be formed using parallel bars. The bent frame is preferable as it is stronger. Their free ends are held parallel by means of the rods $s\,s$. I mount on the free ends of each section a transporting-wheel, $t$. The sections A B are adjustably coupled together by the transverse bars C C'. Said bars pass through the rails of the sections, and are adjustably attached thereto by means of the pins $v$. The object of the adjusting of the sections is so that when trimming young or small plants the cutting-knives may be brought near each other by forcing the sections toward each other, and when trimming large plants they may be extended, as shown by dotted lines of Fig. 1, which allows the sections to pass the plants without pressing or injuring them as the machine advances, cutting the runners from two sides at a time. The points $a$ of the stationary blades stand on a horizontal line or plane with the lower periphery of the drive-wheels F F, so that as the machine advances the runners $x$ are lifted from the ground, as shown in Fig. 3, when the toothed disk or disks, revolving, sever the runners from the plant. The drive-wheels at the same time hold the outer end portion of the runners down as they are cut. The bars C C', coupling the parts A B together, are reduced at their ends and pass through the bars of each section, and are held when adjusted by the screws or staples $v$, which pass through the sections and holes $a'$ of the cross-bars. D is a handle, by which the machine is operated. Its lower end is attached by a hook at $e$ to the front cross-bar, and passes over the standard $i$, attached to the rear bar. The standard passes through a mortise, $r$, in the handle, and is provided with a series of holes, $e'$, and by the pin $a$ is adjustably attached to the handle, the adjusting being done for the purpose of regulating the height of the handle for a tall or short person.

For the purpose of transporting the machine from place to place, I turn it upside down, when it may be conveyed on the wheels $t\,t$.

The sections A B may be made of wood or metal, and the coupling-bars C C' may be arched at the center, and said coupling-bars may be otherwise adjustably attached to the sections without deviating from my present invention.

Having thus set forth my present invention, what I claim as new, and desire Letters Patent therefor, is—

1. In a double device for the purpose set forth, the combination of the sections A B, each carrying a drive-wheel and cutting-disk mounted on a shaft journaled in said sections, and a stationary knife attached to each of the inner bars of said sections, the sections adjustably coupled together, and handle for propelling said machine, substantially as specified.

2. In a double device for the purpose set forth, the combination of the U-shaped sections, each carrying a drive-wheel and a cutting-disk mounted on a shaft journaled in the sections, the stationary knives, as set forth, the sections adjustably coupled together, the handle adjustably coupled to the machine, and a transporting-wheel, $t$, mounted on each section, as and for the purposes specified.

In testimony whereof I affix my signature in presence of two witnesses.

GEORGE W. LOVE.

Witnesses:
EUGENE KIELY,
JOHN L. SMYTHE.